(12) United States Patent
Lin

(10) Patent No.: US 8,870,368 B1
(45) Date of Patent: Oct. 28, 2014

(54) EYEGLASSES WITH REPLACEABLE LENSES

(71) Applicant: China-Star Worldwide Corp., Tainan (TW)

(72) Inventor: Hsu-Nan Lin, Tainan (TW)

(73) Assignee: China-Star Worldwide Corp., Tainan (TW)

( * ) Notice: Subject to any disclaimer, the term of this patent is extended or adjusted under 35 U.S.C. 154(b) by 13 days.

(21) Appl. No.: 13/871,170

(22) Filed: Apr. 26, 2013

(51) Int. Cl.
*G02C 1/08* (2006.01)

(52) U.S. Cl.
CPC .......................................... *G02C 1/08* (2013.01)
USPC .................................. 351/92; 351/86; 351/90

(58) Field of Classification Search
USPC ..................................... 351/92, 86, 90, 83, 96
See application file for complete search history.

(56) References Cited

U.S. PATENT DOCUMENTS

| 3,229,303 | A | * | 1/1966 | Jonassen | 2/443 |
| 6,086,199 | A | * | 7/2000 | Holland et al. | 351/86 |
| 7,219,992 | B1 | * | 5/2007 | Wu | 351/86 |
| 8,641,188 | B2 | * | 2/2014 | DiChiara | 351/86 |
| 2004/0183994 | A1 | * | 9/2004 | DiChiara et al. | 351/92 |
| 2006/0119789 | A1 | * | 6/2006 | Bruck | 351/92 |

* cited by examiner

*Primary Examiner* — Hung Dang
(74) *Attorney, Agent, or Firm* — Rosenberg, Klein & Lee

(57) ABSTRACT

A pair of eyeglasses includes a front having two rims and each rim has a hole. An opening is defined in outside of each rim and includes two ends which have a first connection hole and a second connection hole respectively. Two lenses are engaged with the holes of the two rims. Two connection members each have a temple pivotably connected to the first end thereof, and a third connection hole and a fourth connection hole are respectively defined through the second end of each connection member. A first bolt extends through the first and third connection holes, and a second bolt extends through the second and fourth connection holes. When replacing the lenses, the connection members do not need to be removed from the temples.

1 Claim, 4 Drawing Sheets

EYEGLASSES WITH REPLACEABLE LENSES

BACKGROUND OF THE INVENTION

1. Fields of the Invention

The present invention relates to a pair of eyeglasses, and more particularly, to a pair eyeglasses with replaceable lenses which are easily installed and replaced.

2. Descriptions of Related Art

The conventional eyeglasses such as reading glasses, sport glasses, sun glasses, generally include a front with two rims and two lenses are engaged with the two rims. Two temples are pivotably connected to the two rims.

The conventional rims each have an opening at the outside thereof and a bolt extends through the two ends of the opening to secure the lens with the rim. The lens has to be shaped to meet the shape of the rim, and the bolt is then carefully extended through the two ends of the opening to close the opening and secure the lens within the rim.

However, the single bolt to connect the two ends of the opening of the rim is not reliable and the lens cannot be well secured within the rim. The lens can be easily shifted or disengaged from the rim by impact. The single bolt can be loosened after a long time of use and this is not noticed by the wearers. Once the bolt is loosened, the lens can drop from the rim anytime.

The present invention intends to provide a pair of eyeglasses which has a better securing structure to secure the lens within the rim so as to improve the shortcomings mentioned above.

SUMMARY OF THE INVENTION

The present invention relates to a pair of eyeglasses and comprises a front having two rims and each rim has a hole. An opening is defined in outside of each rim and includes two ends which have a first connection hole and a second connection hole respectively. Two lenses are engaged with the holes of the two rims. Two connection members each have a temple pivotably connected to the first end thereof, and a third connection hole and a fourth connection hole are respectively defined through the second end of each connection member. A first bolt extends through the first and third connection holes, and a second bolt extends through the second and fourth connection holes. When replacing the lenses, the connection members do not need to be removed from the temples.

The primary object of the present invention is to provide a pair of eyeglasses wherein the lenses are securely engaged with the rims, and the connection members do not need to be removed from the temples.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
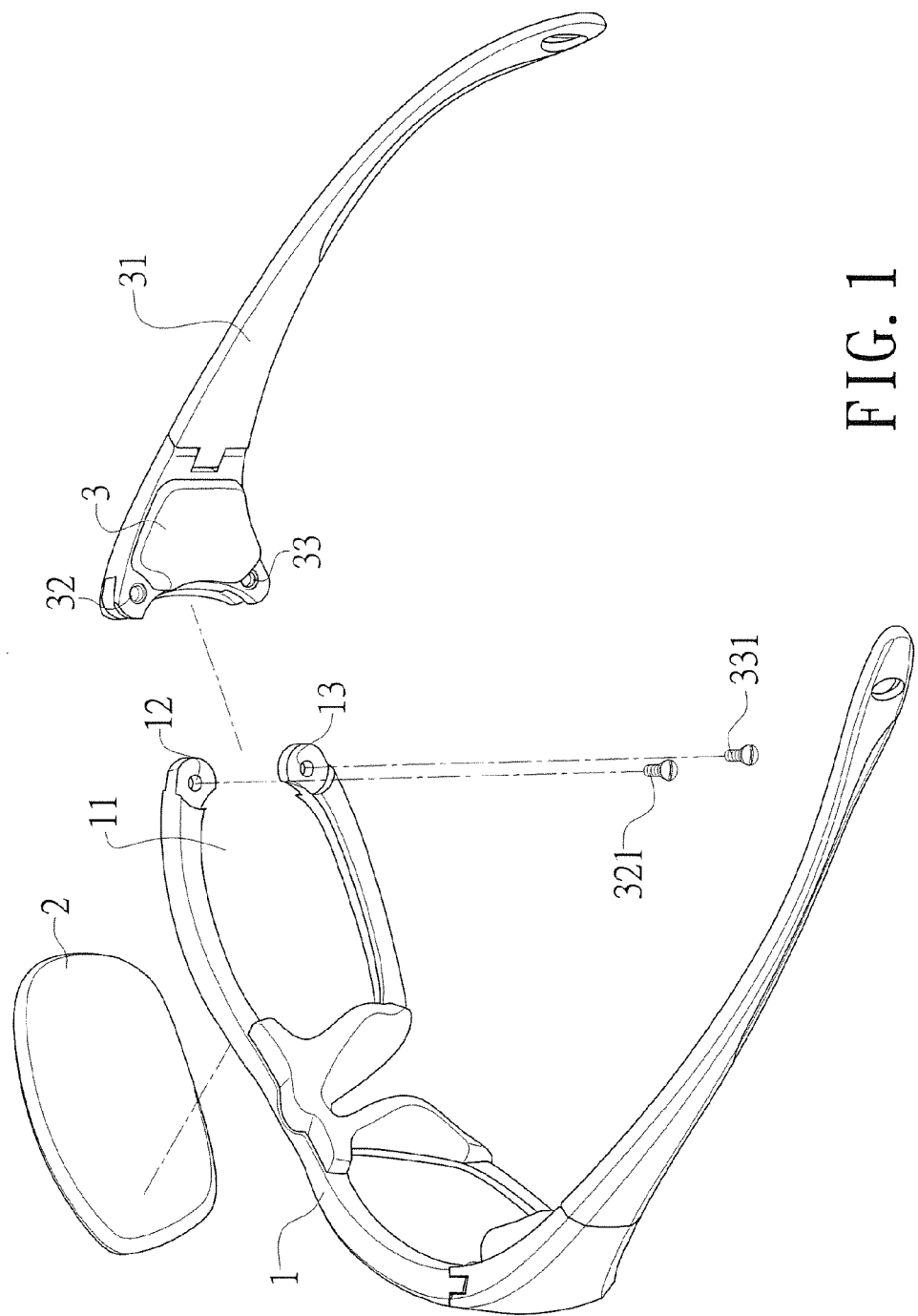
FIG. 1 is an exploded view of the eyeglasses of the present invention.
Figure 2:
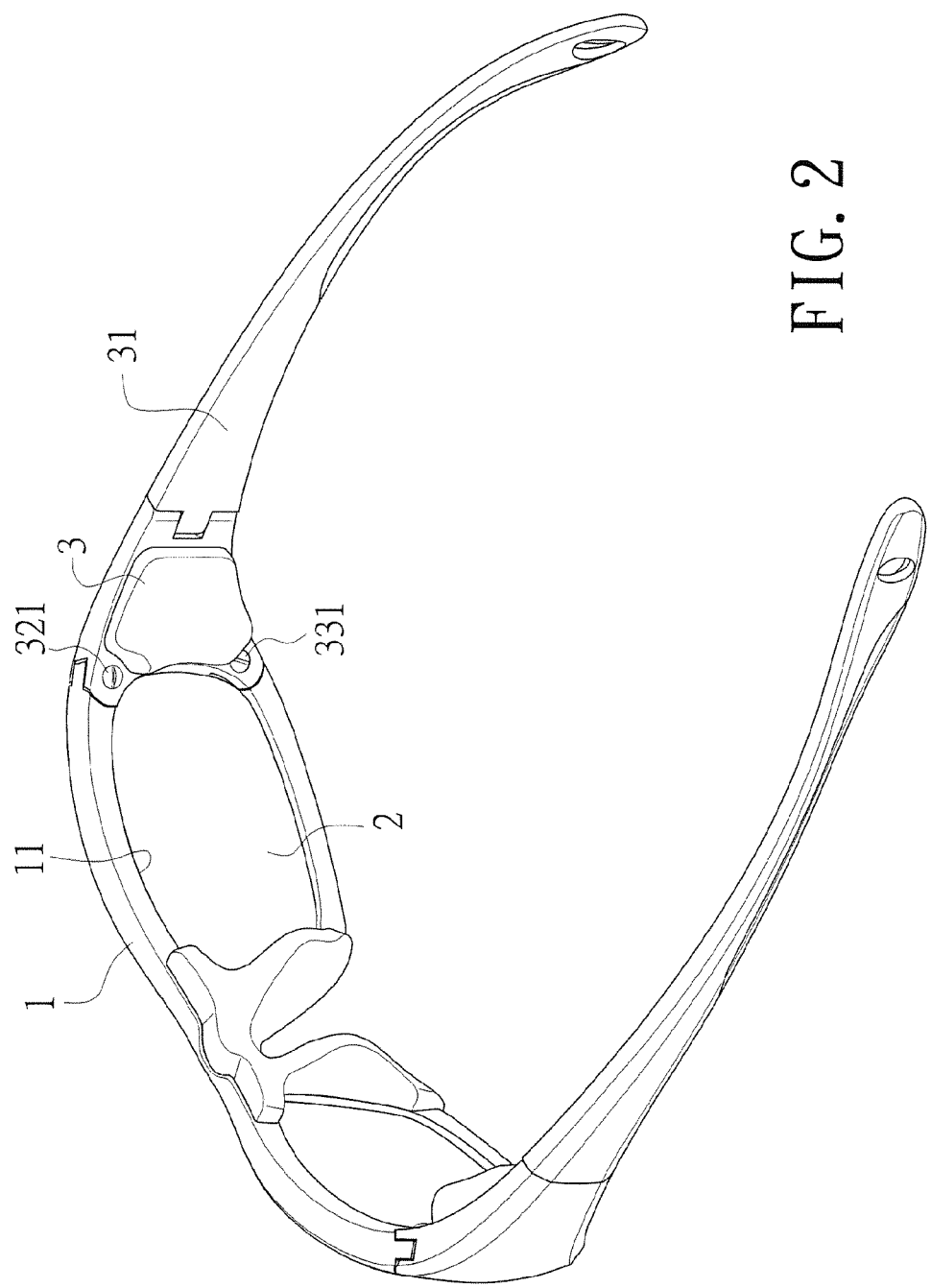
FIG. 2 is a perspective view to show the eyeglasses of the present invention.
Figure 3:
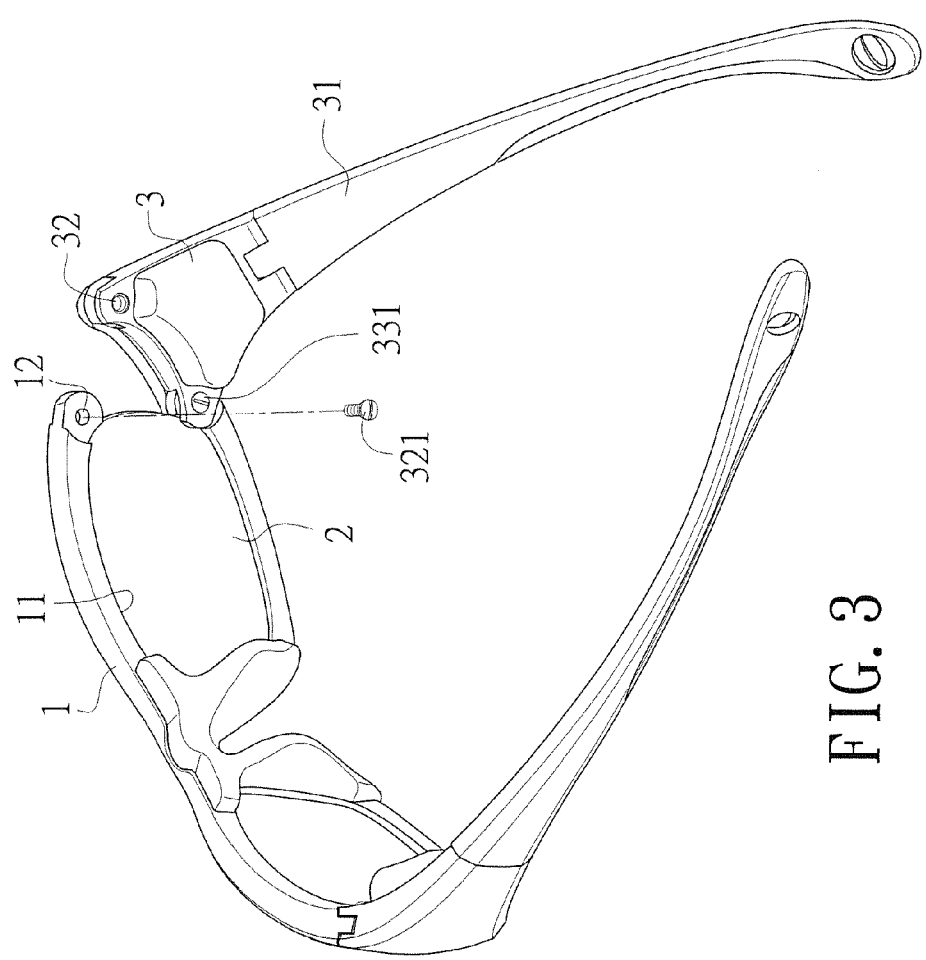
FIG. 3 shows that the first bolt is unscrewed when the lens is to be replaced.

Referring to FIGS. 1 to 3, the eyeglasses of the present invention comprises a front 1, two lenses 2 and two connection members 3.

The front 1 has two rims and each rim has a hole 11. An opening is defined in outside of each rim and has two ends which have a first connection hole 12 and a second connection hole 13 respectively.

The two lenses 2 are engaged with the holes 11 of the two rims respectively.

The two connection members 3 each have a temple 31 pivotably connected to a first end thereof, and a third connection hole 32 and a fourth connection hole 33 are respectively defined through the second end of each connection member 3. A first bolt 321 extends through the first and third connection holes 12, 32, and a second bolt 331 extends through the second and fourth connection holes 13, 33.

When assembling, the lenses 2 are engaged with the holes 11 of the two rims, and the connection members 3 are respectively located corresponding to the openings of the two rims. The first bolt 321 extends through the first and third connection holes 12, 32, and the second bolt 331 extends through the second and fourth connection holes 13, 33 to secure the lenses 2 within the holes 11 of the rims of the front 1.

Figure 4:
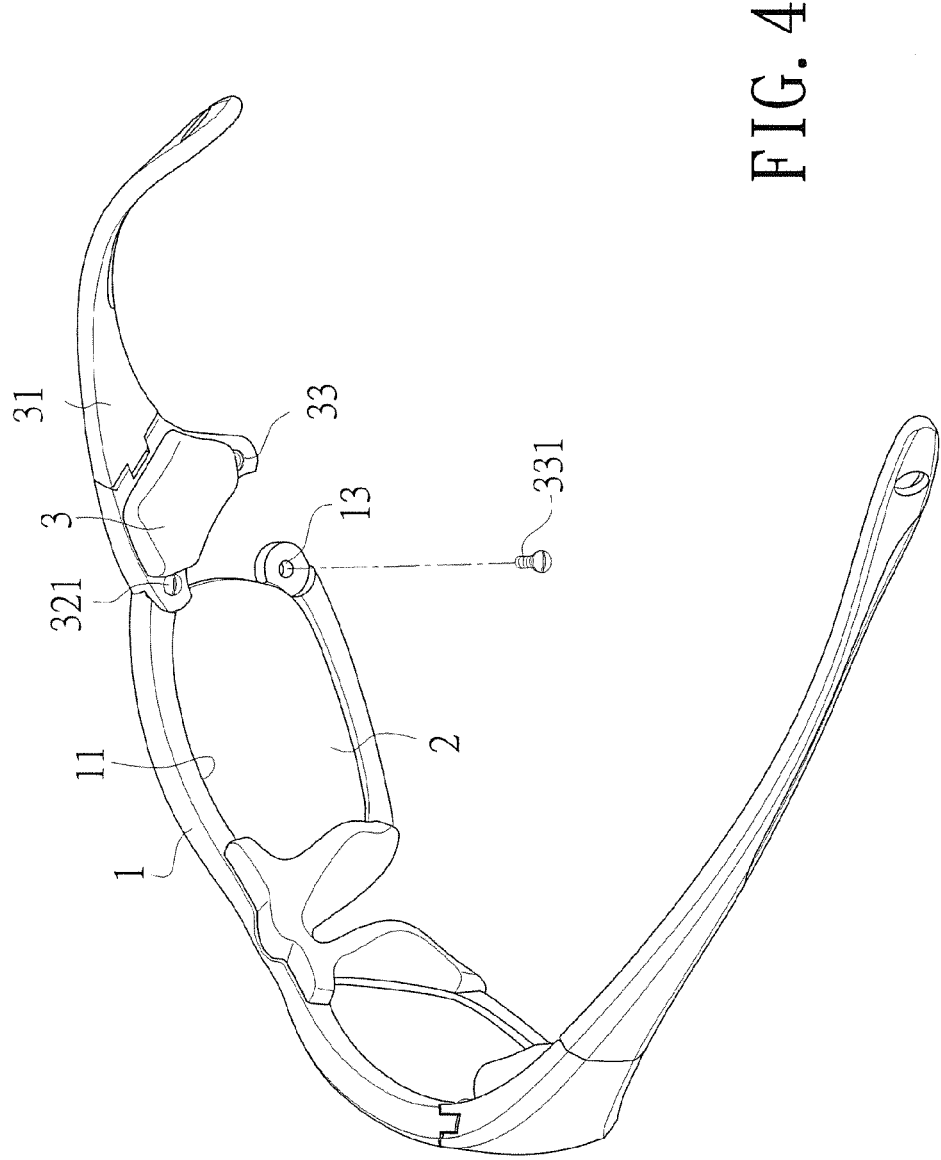
FIG. 4 shows that the second bolt is unscrewed when the lens is to be replaced.

When replacing the lenses 2, as shown in FIGS. 3 and 4, either unscrewing the first bolt 321 from the first and third connection holes 12, 32, or the second bolt 331 the second and fourth connection holes 13, 33, the connection member 3 is not separated from the temple 31, the connection member 3 is pivoted about the remained second/first bolt 331/321 so that the opening is exposed and the lens 2 can be easily removed and replaced. After the new lens 2 is engaged with the hole 11 of the rim, first or second bolt 321 or 331 is tightened again to secure the lens 2.

There are two connection points between the rim and the connection member 3 so that the lens 2 can be well positioned and secured. The connection member 3 is not separated from the temple 31 when replacing the lens 2, which is convenient for the users.

While we have shown and described the embodiment in accordance with the present invention, it should be clear to those skilled in the art that further embodiments may be made without departing from the scope of the present invention.

What is claimed is:

1. A pair of eyeglasses comprising:

a front having two rims and each rim having a hole, an opening defined in outside of each rim and having two ends which have a first connection hole and a second connection hole respectively;

two lenses engaged with the holes of the two rims, and two connection members each having a temple pivotably connected to a first end thereof, a third connection hole and a fourth connection hole respectively defined through a second end of each connection member, a first bolt extending through the first and third connection holes, a second bolt extending through the second and fourth connection holes.

* * * * *